Patented Feb. 7, 1933

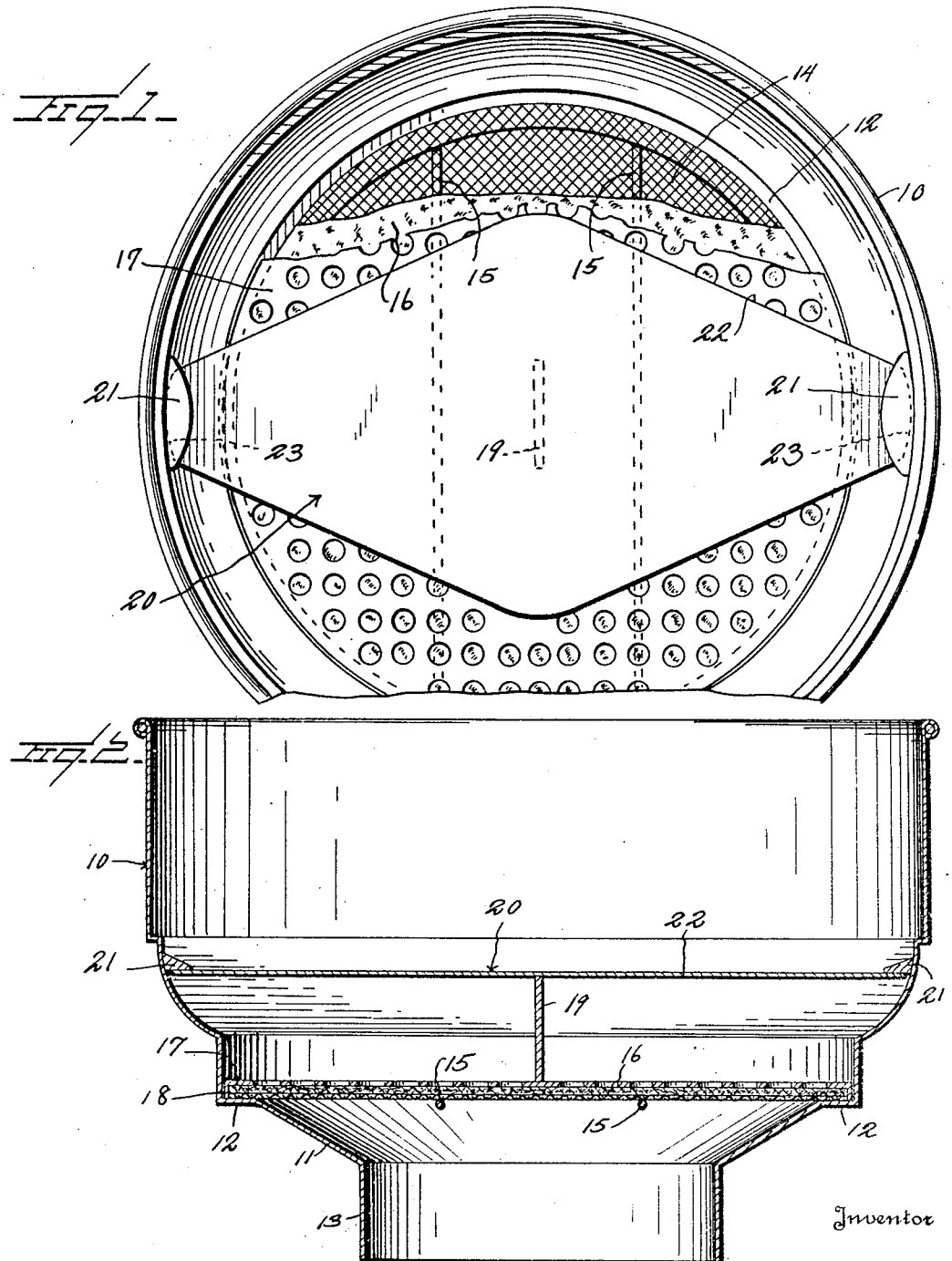

1,896,816

UNITED STATES PATENT OFFICE

EDWIN E. GOTTMAN, OF TONGANOXIE, KANSAS

MILK STRAINER

Application filed April 9, 1931. Serial No. 528,903.

This invention relates to milk strainers, and has for an important object thereof the provision of a strainer which may be used with either a mechanical milker or the like.

Another object of this invention is to provide in a strainer of this kind means by which the straining medium will not become unduly worn during the milking operation.

A further object of this invention is to provide a strainer of this kind with means by which an exceedingly large quantity of milk may be readily and quickly passed through the strainer.

A still further object of this invention is to provide in a device of this kind means whereby the straining medium may be readily replaced.

The above and various other objects and advantages of this invention will in part be described in and in part be understood from the following detailed description of the present preferred embodiment, the same being illustrated in the accompanying drawing, wherein:—

Figure 1 is a detail top plan view partly broken away of a device constructed according to the preferred embodiment of this invention, and Figure 2 is a vertical sectional view taken substantially through the center of the device.

Referring to the drawing wherein like numerals of reference designate corresponding parts throughout the several views, the numeral 10 designates generally a hopper or funnel which is provided at the lower end thereof with an open neck 13 which is adapted to engage the top of a milk can or receptacle.

In strainers at present in use, the strainers are of a diameter substantially equal to the diameter of the neck portion 13, and where a number of milking machines are used for filling of a single receptacle, the strainer is not of sufficient capacity to readily pass the milk therethrough as fast as the milking machines are able to draw the milk.

The tapering portion 11 of the hopper 10 is provided with a shoulder 12 at a point above the top of the neck 13, the diameter of the tapering portion 11 at the shoulder 12 being greater than the diameter of the neck 13.

A screen disk or perforated support 14 is adapted to rest on the shoulder 12 and is provided with braces 15 so as to support the screen and prevent it from bending under the weight of the milk disposed in the hopper 10. A filtering element or strainer 16 is disposed on the upper surface of the supporting screen 14, this filtering or straining member comprising a pad composed of cotton or the like.

An upper perforated plate 17 is disposed on the upper surface of the straining element 16 and is provided at the peripheral edges thereof with a depending flange 18 which engages about the edges of the straining element 16 and also the supporting perforated disk or screen 14. An upstanding member 19 is mounted on the upper face of the plate 17 at substantially the center thereof, and a clamping plate or baffle 20 is adapted to engage the top of the lug 19, this baffle 20 being adapted to removably engage lugs 21 carried by the hopper 10. This baffle 20 has converging edge portions which converge from the center thereof toward each end, as indicated at 22, and the ends of the baffle 20 are provided with arcuate portions 23 for engagement with the interior of the hopper 10. When the baffle 20 is in position, the baffle is bowed longitudinally so as to place the baffle under tension and to resiliently hold the perforated plate 17 into engagement with the straining element 16. In this manner, the baffle 20 not only prevents the milk, when poured into the strainer, from striking the plate 17 directly so as to wear holes or the like through the straining element 16, but this baffle also tensions the strainer so that it will stay in position in the event the hopper 10 is removed from the top of the milk can.

In the use of this device, the straining members 14, 16 and 17 may be placed on the shoulder 12 and the baffle 20 extended across the top supporting lug 19 and the ends 23 of the baffle positioned beneath the lugs 21 mounted on the hopper 10. The milk may be then placed in the hopper 10 during the milking operation, the force of the milk striking the baffle 20 and running off therefrom onto the perforated plate 17 through which the milk will pass through the straining elements 16 and 14.

In actual practice, it has been found that by increasing the diameter of the straining elements only slightly, the capacity of the strainer is practically trebled and the straining element 16 through the use of the baffle 20 and the perforated plate 17 will last a greater length of time than where the straining element 16 is placed loosely on top of the screen 14 or between a pair of perforated plates. Furthermore, through the use of the baffle 20, it is possible to increase the size of the holes in the plate 17 inasmuch as the baffle 20 will receive the impact of the milk so that the stream or streams of milk from the milking machine will not strike the filtering member 16.

It is, of course, understood that various changes and modifications may be made in the details of construction and design of the above specifically described embodiment of this invention without departing from the spirit thereof, such changes and modifications being restricted only by the scope of the following claims.

I claim:—

1. A milk strainer of the character described comprising in combination a funnel-shaped hopper, a screen mounted in the hopper, a fabric straining element mounted on the screen, a flanged perforated plate mounted on the upper face of said fabric, a non-perforated baffle disposed above the perforated plate and having a width less than the diameter of the hopper engaged thereby, and coacting means carried by the plate and the hopper for tensioning the baffle and the plate within the hopper.

2. A milk strainer of the character described comprising in combination, a hopper, a metal screen mounted in the hopper at a point spaced upwardly from the lower end thereof, bracing means carried by the screen, a fabric filtering element mounted on the top of said screen, a perforated plate mounted on top of said filtering element, an annular flange carried by the plate and engaging about the filtering element and the screen, an upstanding lug mounted on said plate, a baffle engaging the top of said lug and extending diametrically across said hopper, and lugs carried by the hopper and engaging each end of the baffle whereby to tension the baffle and the plate within the hopper.

3. A milk strainer of the character described comprising in combination, a hopper having a restricted neck portion and a shoulder disposed intermediate the upper and lower ends thereof, the diameter of the hopper at the shoulder being greater than the diameter of the neck, straining means resting on the shoulder, and an imperforate baffle disposed above the straining means having an enlarged central portion and restricted end portions.

4. A milk strainer of the character described comprising a funnel-shaped hopper, a straining element mounted in the hopper at a point spaced upwardly from the lower end thereof, an upstanding lug carried by the straining element, a resilient imperforate baffle, and lugs carried by the hopper and adapted for engagement with the ends of the baffle whereby to tension the baffle and coactively hold the baffle into engagement with said upstanding lug.

5. In a milk strainer including a hopper and a straining element mounted within the hopper, an imperforate baffle engaging the hopper, said baffle having a relatively large central portion and restricted opposite end portions, and means carried by the hopper and the element for tensioning the baffle to hold the element against movement in the hopper.

6. A milk strainer of the character described comprising in combination, a funnel-shaped hopper, a screen mounted in the hopper, a fabric straining element mounted on the screen, a flanged perforated plate mounted on the upper face of said fabric, an imperforate baffle disposed above the plate, and coacting means carried by the plate and the hopper for tensioning the baffle and the plate within the hopper.

In testimony whereof I hereunto affix my signature.

EDWIN E. GOTTMAN.